(12) United States Patent
Kikuchi et al.

(10) Patent No.: US 8,309,256 B2
(45) Date of Patent: Nov. 13, 2012

(54) MICROPOROUS FILM AND METHOD FOR PRODUCING THE SAME

(75) Inventors: Kentaro Kikuchi, Tokyo (JP); Shunichiro I, Tokyo (JP)

(73) Assignee: Asahi Kasei E-materials Corporation, Tokyo (JP)

( * ) Notice: Subject to any disclaimer, the term of this patent is extended or adjusted under 35 U.S.C. 154(b) by 47 days.

(21) Appl. No.: 12/935,439

(22) PCT Filed: Mar. 24, 2009

(86) PCT No.: PCT/JP2009/055787
§ 371 (c)(1),
(2), (4) Date: Sep. 29, 2010

(87) PCT Pub. No.: WO2009/122961
PCT Pub. Date: Oct. 8, 2009

(65) Prior Publication Data
US 2011/0027659 A1  Feb. 3, 2011

(30) Foreign Application Priority Data
Mar. 31, 2008  (JP) .................................. 2008-093265

(51) Int. Cl.
*H01M 2/16* (2006.01)
(52) U.S. Cl. .... 429/253; 264/41; 264/288.8; 428/315.5; 428/315.9; 521/50; 521/134; 521/180
(58) Field of Classification Search .................. 429/253; 264/41, 288.8; 428/315.5, 315.9; 521/50, 521/134, 180
See application file for complete search history.

(56) References Cited

U.S. PATENT DOCUMENTS

| | | | |
|---|---|---|---|
| 5,240,655 A | 8/1993 | Troffkin et al. | |
| 5,242,126 A | 9/1993 | Bomze | |
| 5,281,491 A | 1/1994 | Rein et al. | ........................ 429/62 |
| 5,604,284 A | 2/1997 | Ueda et al. | |
| 5,652,326 A | 7/1997 | Ueda et al. | .................... 528/288 |
| 6,627,346 B1 | 9/2003 | Kinouchi et al. | |
| 2006/0127753 A1 | 6/2006 | Nakashima et al. | .......... 429/142 |
| 2008/0070086 A1* | 3/2008 | Fukuchi et al. | .................. 429/33 |
| 2011/0027659 A1 | 2/2011 | Kikuchi et al. | |
| 2011/0166243 A1* | 7/2011 | Kikuchi et al. | ................ 521/134 |
| 2011/0195295 A1* | 8/2011 | Manago et al. | ................ 429/145 |

FOREIGN PATENT DOCUMENTS

| | | |
|---|---|---|
| JP | 44-15422 | 7/1969 |
| JP | 52-030545 | 3/1977 |
| JP | 3-291848 | 12/1991 |
| JP | 05-251069 | 9/1993 |
| JP | 6-256555 | 9/1994 |
| JP | 6-313078 | 11/1994 |
| JP | 8-034872 | 2/1996 |
| JP | 8-100074 | 4/1996 |
| JP | 2000-198866 | 7/2000 |
| JP | 2001-38159 A | 2/2001 |
| JP | 2001-135295 A | 5/2001 |
| JP | 2003-238719 | 8/2003 |
| JP | 2004-149637 A | 5/2004 |
| JP | 2005-71978 | 3/2005 |
| JP | 2006-083294 | 3/2006 |
| JP | 2008-144039 | 6/2008 |
| WO | 2009/122961 A1 | 8/2009 |

OTHER PUBLICATIONS

Communication from the European Patent Office dated Jun. 27, 2011 in a counterpart European application No. 09803039.8.
International Search Report from counterpart PCT application dated Aug. 25, 2009 PCT application PCT/JP2009063636.
International Preliminary Report on Patentability from counterpart PCT application dated Feb. 1, 2011 PCT/JP2009063636.
International Preliminary Report on Patentability from counterpart PCT application dated Mar. 8, 2011 PCT/JP2009063636.
International Search Report from counterpart PCT application dated Jun. 16, 2009 PCT/JP2009055787.

* cited by examiner

*Primary Examiner* — Douglas Mc Ginty
(74) *Attorney, Agent, or Firm* — Morgan, Lewis & Bockius LLP

(57) ABSTRACT

Provided is a microporous film formed of a thermoplastic resin composition comprising 100 parts by mass of (a) a polyolefin resin and from 5 to 90 parts by mass of (b) a polyphenylene ether resin; the microporous film having a sea-island structure with the polyolefin resin as a sea portion and with the polyphenylene ether resin as an island portion and having a air permeability of from 10 sec/100 cc to 5000 sec/100 cc. The microporous film does not break easily even at high temperatures and has good heat resistance.

9 Claims, 4 Drawing Sheets

MICROPOROUS FILM AND METHOD FOR PRODUCING THE SAME

This application is a national stage of International Application No. PCT/JP2009/055787 filed on Mar. 24, 2009, which is hereby incorporated by reference.

TECHNICAL FIELD

The present invention relates to a microporous film, a laminated microporous film, a battery separator, and a method for producing the microporous film.

BACKGROUND ART

Microporous films, particularly, polyolefin microporous films have been used for microfiltration membranes, battery separators, capacitor separators, fuel cell materials, and the like. They have been used particularly for separator for lithium ion batteries. In recent years, lithium ion batteries have been used for hybrid electric vehicles as well as compact electronic devices such as mobile phones and laptop personal computers.

Lithium ion batteries used for hybrid electric vehicles are required to have a higher output performance in order to produce much energy in a short period of time. In addition, lithium ion batteries used for hybrid electric vehicles are required to ensure higher safety because they usually have a large size and a high energy capacity. The term "safety" as used herein means particularly safety against short-circuit (short) of a battery due to melting of the resin used for the separator under high temperature conditions at the using time of the battery. The temperature at which short-circuit occurs inside the battery is called film rupture temperature of the separator and raising this film rupture temperature is one of the means for improving the safety of the battery.

With a view to providing a microporous film which will serve as a separator capable of coping with the situation described above, there is proposed a composite microporous film (separator for batteries) having a laminated structure obtained by stacking a polypropylene microporous film over a conventional polyethylene microporous film according to Patent Document 1.

Polypropylene is used in order to raise the short-circuit temperature. Described specifically, separators are required to maintain their film form even under high temperature condition and keep insulation between electrodes. The polypropylene resin used as a heat resistant layer, however, does not have sufficient heat resistance under severe conditions, for example, in a battery oven test that has been performed recently.

According to Patent Document 2, a synthetic resin microporous film made of polyethylene is covered with porous polymer powders made of a specific resin and therefore has improved stability at high temperature. Such a film has however still insufficient heat resistance under severe conditions, for example, in the battery oven test.

[Patent Document 1] Japanese Patent Laid-Open No. Hei 05-251069
[Patent Document 2] Japanese Patent Laid-Open No. Hei 03-291848

DISCLOSURE OF THE INVENTION

Problem to be Solved by the Invention

With the foregoing in view, the present invention has been made. An object of the present invention is to provide a microporous film which is difficult to break even at high temperatures and has good heat resistance. Another object of the present invention is to provide a microporous film having a high film rupture temperature and well balanced between porosity and air permeability.

Means for Solving the Problem

With a view to achieving the above-described objects, the present inventors have proceeded with an extensive investigation. As a result, it has been found that microporous films having a sea-island structure with a polyolefin resin (such as polypropylene resin) as a sea portion and with a polyphenylene ether resin as an island portion are excellent in heat resistance and difficult to break even at high temperatures compared with microporous films not having a sea-island structure.

It has also been found that when microporous films having such a sea-island structure are produced by carrying out stretching at two or more stages, the resulting films can have improved heat resistance.

It has further been found that microporous films having such a sea-island structure have a high film rupture temperature and adequate porosity and air permeability so that they are suited for use as a separator for lithium ion batteries, leading to the completion of the present invention.

Described specifically, the present invention is as follows.

[1] A microporous film having a thermoplastic resin composition which is formed of 100 parts by mass of (a) a polyolefin resin and from 5 to 90 parts by mass of (b) a polyphenylene ether resin, the microporous film having a sea-island structure with the polyolefin resin as a sea portion and the polyphenylene ether resin as an island portion and having a air permeability of from 10 sec/100 cc to 5000 sec/100 cc.

[2] The microporous film according to [1] wherein the polyolefin resin (a) is a polypropylene resin or a polyethylene resin.

[3] The microporous film according to [1] or [2], having a porosity of from 20% to 70%.

[4] The microporous film according to [1] to [3], wherein the thermoplastic resin composition further comprises from 1 to 20 mass % of (c) a compatibilizing agent.

[5] The microporous film according to [4], wherein the compatibilizing agent (c) is a hydrogenated block copolymer obtained by hydrogenating a block copolymer having at least one polymer block A composed mainly of a vinyl aromatic compound and at least one polymer block B composed mainly of a conjugated diene compound with a total content of a 1,2-vinyl bond and a 3,4-vinyl bond of from 30 to 90%.

[6] The microporous film according to any one of Claims [1] to [5], wherein the island portion has a particle size of from 0.01 μm to 10 μm.

[7] A laminated microporous film having the microporous film as described in any one of [1] to [6] and a microporous film formed of a thermoplastic resin having a melting temperature of from 100° C. to 150° C.

[8] A battery separator having the microporous film as described in any one of [1] to [6] or the laminated microporous film as described in [7].

[9] A method for producing the microporous film as described in any one of [1] to [6], including the following steps (A) and (B):
(A) a step of cold stretching a film formed of a thermoplastic resin composition comprising 100 parts by mass of (a) a polypropylene resin and from 5 to 90 parts by mass of (b) a polyphenylene ether resin at a temperature of −20° C. or greater but less than 100° C.; and (B) a step, after the cold stretching step, of hot stretching the cold-stretched film at a temperature of 100° C. or greater but less than 170° C.

Effect of the Invention

The microporous film of the present invention is difficult to break even at high temperatures, in other words, has a high film rupture temperature. Further, the microporous film of the present invention is well balanced between porosity and air permeability.

BEST MODE FOR CARRYING OUT THE INVENTION

The best mode for carrying out the invention (which will hereinafter be called "embodiment") will next be described in detail. The present invention is not limited to the following embodiment, but various modifications may be effected without departing from the scope of the present invention.

The microporous film in the present embodiment is formed by using a thermoplastic resin composition comprising, 100 parts by mass of a polyolefin resin and from 5 to 90 parts by mass of a polyphenylene ether resin.

Details will hereinafter be described.

[Polyolefin Resin]

The polyolefin resin (a) to be used in the present embodiment is a polymer comprising, as a monomer component thereof, an olefinic hydrocarbon such as propylene or ethylene. The polyolefin resin may be either a homopolymer or a copolymer. When the polyolefin resin is a copolymer, the copolymerization ratio of the olefinic hydrocarbon is preferably 50 mass % or greater. It may be 70 mass % or greater, or may be 90 mass % or greater. Examples of the polyolefin resin (a) include polypropylene resin, polyethylene resin, and ethylene-propylene copolymer. Among these resins, polypropylene resin is preferred.

The polypropylene resin (a) (which may hereinafter be abbreviated as "PP") to be used in the present embodiment is a polymer comprising, as a monomer component thereof, polypropylene. It may be either a homopolymer or a copolymer. When the polypropylene resin is a copolymer, it may be a random copolymer or a block copolymer. When it is a copolymer, no limitation is imposed on a copolymerization component. Examples of it include ethylene, butene, and hexene.

When the polypropylene resin is a copolymer, the copolymerization ratio of propylene is preferably 50 mass % or greater. It may be 70 mass % or greater or may be 90 mass % or greater.

The polyolefin resin may be used singly or two or more of them may be used as a mixture. No particular limitation is imposed on a polymerization catalyst. Examples of it include Ziegler Natta catalysts and metallocene catalysts. In addition, no particular limitation is imposed on the stereoregularity of it and either isotactic or syndiotactic polyolefin resin is usable.

Although a polyolefin resin having any crystallinity or any melting temperature can be used alone in the present embodiment, a polyolefin resin composition obtained by mixing two polyolefin resins different in properties at a ratio within a predetermined range may be used, depending on the physical properties or intended use of the microporous film thus obtained.

The polypropylene resin to be used in the present embodiment is preferably selected from those having a melt flow rate (as measured at 230° C. under a load of 2.16 kg in accordance with ASTM D1238) ranging from 0.1 to 100 g/10 min, more preferably from 0.1 to 80 g/10 min.

The polypropylene resin to be used in the present embodiment may be, as well as the above-described polypropylene resin, a known modified polypropylene resin as described in Japanese Patent Laid-Open No. Sho 44-15422, Japanese Patent Laid-Open No. Sho 52-30545, Japanese Patent Laid-Open No. Hei 6-313078, and Japanese patent Laid-Open No. 2006-83294. Further, a mixture of the polypropylene resin and the modified polypropylene resin mixed at any ratio may be used.

[Polyphenylene Ether Resin]

No limitation is imposed on the polyphenylene ether resin (b) to be used in the present embodiment and it is, for example, preferably a polyphenylene ether (which may hereinafter be abbreviated as "PPE") having a repeating unit represented by the following formula:

[Chemical formula 1]

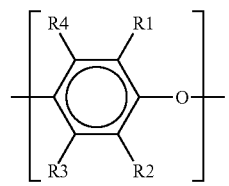

(wherein, R1, R2, R3, and R4 may be the same or different and each is selected from the group consisting of hydrogen, halogens, lower alkyl groups having from 1 to 7 carbon atoms, phenyl groups, haloalkyl groups, aminoalkyl groups, hydrocarbon oxy groups, and halohydrocarbon oxy groups having at least two carbon atoms separating the halogen atom from the oxygen atom).

Specific examples of PPE include poly(2,6-dimethyl-1,4-phenylene ether), poly(2-methyl-6-ethyl-1,4-phenylene ether), poly(2-methyl-6-phenyl-1,4-phenylene ether), and poly(2,6-dichloro-1,4-phenylene ether). Additional examples include polyphenylene ether copolymers such as copolymers of 2,6-dimethylphenol with another phenol (such as 2,3,6-trimethylphenol or 2-methyl-6-butylphenol). Of these, poly(2,6-dimethyl-1,4-phenylene ether) and a copolymer of 2,6-dimethylphenol and 2,3,6-trimethylphenol are preferred, with poly(2,6-dimethyl-1,4-phenylene ether) being more preferred.

No particular limitation is imposed on the production method of the PPE and any PPE available by a known production method is usable in the present embodiment.

The PPE to be used in the present embodiment may be a known modified PPE available by reacting the above-described PPE with a styrene monomer and/or an α,β-unsaturated carboxylic acid or derivative thereof (for example, an ester compound or acid anhydride compound) at a temperature of from 80° C. to 350° C. under a molten state, solution state, or slurry state in the presence or absence of a radical generator. The above-described PPE mixed with the modified PPE at any ratio is also usable. The reduced viscosity of the PPE to be used in the present embodiment is preferably from 0.15 to 2.5, more preferably from 0.30 to 2.00.

With regards to the amount of the PPE, the polyphenylene ether resin (b) is added in an amount of from 5 to 90 parts by mass, preferably from 10 to 80 parts by mass, more preferably from 20 to 65 parts by mass, to 100 parts by mass of the polyolefin resin (a). Amount of the PPE to fall within the above-described range is preferred from the standpoint of the stretchability of the film thus obtained.

As the polyphenylene ether resin to be used in the present embodiment, a mixture obtained by adding, to the PPE, another polymer, which is compatible with the PPE, such as polystyrene, high impact polystyrene, syndiotactic polystyrene, and/or rubber-reinforced syndiotactic polystyrene is usable preferably as well as the PPE alone. In this case, the PPE content in the mixture is 50 mass % or greater, preferably 80 mass % or greater, more preferably 90 mass % or greater.

[Compatibilizing Agent]

The microporous film in the present embodiment has, as shown in the transmission electron micrograph of FIG. 1, a sea-island structure having the polyolefin resin as a sea portion and the polyphenylene ether resin as an island portion. It is preferably a microporous film whose island portion has a particle size in a range of from 0.01 μm to 10 μm.

It is particularly preferred to produce the microporous film of the present embodiment by using a thermoplastic resin composition comprising a compatibilizing agent (c), in addition to the polyolefin resin (a) and the polyphenylene ether resin (B).

The compatibilizing agent (c) to be used in the present embodiment acts as a dispersing agent for dispersing the polyphenylene ether resin in the form of particles in the matrix of the polyolefin resin. It provides a good porosity and a good air permeability to the microporous film of the present invention.

The compatibilizing agent (c) to be used in the present embodiment is preferably a hydrogenated block copolymer from the viewpoint of dispersibility of the polyphenylene ether resin. The hydrogenated block copolymer is a block copolymer available by hydrogenating a block copolymer having at least one polymer block A composed mainly of a vinyl aromatic compound and at least one polymer block B composed mainly of a conjugated diene compound.

Examples of the conjugated diene compound constituting the polymer block B of the block copolymer include butadiene, isoprene, 1,3-pentadiene, and 2,3-dimethyl-1,3-butadiene. They can be used either singly or in combination of two or more. Among these, butadiene, isoprene, and combination of them are preferred. The term "polymer block composed mainly of a conjugated diene compound" means a polymer comprising at least 70 mass % of the conjugated diene compound, and it includes a homopolymer of the conjugated diene compound and a copolymer of the conjugated diene compound and a monomer that is copolymerizable with the conjugated diene. With regards to the microstructure (bonding form of the conjugated diene compound) in the polymer block B, a total content of a 1,2-vinyl bond and a 3,4-vinyl bond (which will hereinafter be abbreviated as "vinyl bond content") is preferably from 30 to 90%, more preferably from 45 to 85%. The bonding form of these conjugated diene compounds can ordinarily be found from their infrared spectrum or NMR spectrum. The vinyl bond content can be determined from the number of the vinyl bonds thus determined. A microporous film having the vinyl bond content of 30% or greater is excellent in the balance between porosity and air permeability, which is the characteristic of the microporous film of the present invention.

Examples of the vinyl aromatic compound constituting the polymer block A include styrene, α-methylstyrene, vinyltoluene, p-tert-butylstyrene, and diphenylethylene. They can be used either singly or in combination of two or more. Among these, styrene is preferred. The polymer block A composed mainly of a vinyl aromatic compound is a polymer comprising at least 70 mass % of the vinyl aromatic compound, and it includes a homopolymer of the vinyl aromatic compound or a copolymer of the vinyl aromatic compound and a monomer that is copolymerizable with the vinyl aromatic compound.

The block copolymer having the above structure has a number-average molecular weight preferably ranging from 5,000 to 1,000,000 and a molecular weight distribution [a ratio of the weight-average molecular weight (Mw) to the number-average molecular weight (Mn) measured by gel permeation chromatography] of preferably 10 or less. Further, the molecular structure of the block copolymer may be linear, branched, or radial, or any combination thereof.

The block copolymer having the above described structure can be converted into a hydrogenated block copolymer, that is, a hydrogenated product of a block copolymer of a vinyl aromatic compound and a conjugated diene compound, by hydrogenating the aliphatic double bond of the polymer block B contained in the block copolymer. It is used as the component (c) of the present invention. The hydrogenation ratio of the aliphatic double bond is preferably 80% or greater. The hydrogenation ratio can usually be found from the infrared spectrum, NMR spectrum, or the like.

The proportion of the admixture (c) in the thermoplastic resin composition is preferably from 1 to 20 mass %, more preferably from 1 to 15 mass %. Such a proportion is preferred from the standpoint of dispersibility of the polyphenylene ether resin and the porosity and air permeability of the microporous film of the present invention attributable to the dispersibility.

In the present invention, components other than the above-described ones may be added to the thermoplastic resin composition constituting the microporous film as needed without damaging the characteristics and effects of the present invention and examples of such additional components include olefinic elastomers, antioxidants, metal deactivators, heat stabilizers, flame retardants (organic phosphate ester compounds, poly(ammonium phosphate) compounds, halogenated aromatic flame retardants, silicone flame retardants, and the like), fluorine-based polymers, plasticizers (low-molecular-weight polyethylene, epoxidized soybean oil, polyethylene glycol, fatty acid esters, and the like), flame retardant synergists such as antimony trioxide, weather (light) resistance improvers, nucleating agents for polyolefins, slipping agents, inorganic or organic filling materials or reinforcing materials (polyacrylonitrile fibers, carbon black, titanium oxide, calcium carbonate, conductive metal fibers, conductive carbon black, and the like), various colorants, and release agents.

[Production of Microporous Film]

No limitation is imposed on a production method of the microporous film of the present embodiment and it can be produced by the method including the following steps (A) and (B). This method enables the production of the microporous film having a good permeability and equipped with a sea-island structure.

(A) a step of cold stretching a thermoplastic resin composition comprising 100 parts by mass of (a) a polyolefin resin and from 5 to 90 parts by mass of (b) a polyphenylene ether resin at a temperature of −20° C. or greater but less than 100° C.

(B) a step, after the cold stretching step, of hot stretching the thermoplastic resin composition at a temperature of 100° C. but less than 170° C.

The production method of the microporous film in this embodiment preferably includes a sheeting step and a stretching step, and the stretching step preferably includes the above-described steps (A) and (B).

In the sheeting step, T-die extrusion, inflation, calendering, and scaif method can be employed. Among these, T-die extrusion is preferred from the standpoint of physical properties which the microporous film available in the present embodiment is required to have or intended use of the film.

In the stretching step, on the other hand, monoaxial and/or biaxial stretching using a roll, tenter, autograph, or the like can be employed. Among these, monoaxial stretching at two or more stages by using a roll is preferred from the standpoint of physical properties which the microporous film available in the present embodiment is required to have or intended use of the film. When monoaxial stretching is employed in the step (A) and the step (B), respective stretching directions in these steps are not limited, but they are preferably the same. The direction is preferably an extrusion direction (which will hereinafter be called "MD direction).

The production method of the microporous film in the present embodiment will be described with an example, but the present embodiment is not limited to it.

[Sheeting Step]

A resin composition composed of a mixture of the polypropylene resin (a), the polyphenylene ether resin (b), and the compatibilizing agent (c) in amounts within specified ranges, respectively, is supplied to an extruder and melted and kneaded at a temperature of from 200° C. to 350° C., preferably from 260° C. to 320° C. to obtain pellets of the thermoplastic resin composition having the polyphenylene ether resin dispersed in the polypropylene resin. Then, the pellets of the thermoplastic resin composition thus obtained are supplied to an extruder and extruded into a film from a T-die at a temperature of from 200° C. to 350° C., preferably from 260° C. to 320° C. The film thus obtained is casted on a roll of from 20 to 150° C., preferably from 50° C. to 120° C. and solidified by cooling.

Alternatively, sheeting may be performed by supplying an extruder with a resin composition composed of a mixture of the polypropylene resin (a), the polyphenylene ether resin (b), and the compatibilizing agent (c) mixed in amounts within specified ranges, respectively; melting and kneading the resin composition at a temperature of from 200° C. to 350° C., preferably from 260° C. to 320° C. to disperse the polyphenylene ether resin in the polypropylene resin; extruding the resulting kneaded mass into a film directly from a T die without forming the kneaded mass into pellets; and casting the film on a roll of from 20 to 150° C., preferably from 50° C. to 120° C. to solidify the film by cooling.

[Stretching Step (Step (A))]

The film obtained in the sheeting step is then stretched at a draw ratio of 1.1 or greater but less than 2.0 in the MD direction and at a draw ratio of from 1.0 to 2.0 in the width direction (which will hereinafter be called "TD direction"), respectively, at a temperature of −20° C. or greater but less than 100° C., preferably 0° C. or greater but less than 50° C. The film is more preferably monoaxially stretched at a draw ratio of from 1.1 to 2.0 in the MD direction at a temperature of 0° C. or greater but less than 50° C. The film obtained by stretching at the temperature not greater than −20° C. is likely to break. The film obtained by stretching at a temperature of 100° C. or greater, on the other hand, is likely to have a low porosity and a high air permeability.

In order to improve the permeability of the microporous film available in the present embodiment, the film obtained in the sheeting step may be heat treated for a predetermined time within a temperature range of 50° C. or greater but less than 160° C. prior to the stretching step (Step (A)).

[Stretching Step (Step (B))]

The stretched film thus obtained is then stretched at a draw ratio of 1.1 or greater but less than 5.0 in the MD direction and at a draw ratio of from 1.0 to 5.0 in the TD direction, respectively, at a temperature of 100° C. or greater but less than 170° C., preferably 130° C. or greater but less than 160° C. to obtain the microporous film of the present embodiment. More preferably, the microporous film of the present embodiment is obtained by carrying out monoaxial stretching at a draw ratio of from 2.0 to 5.0 in MD direction at a temperature of 130° C. or greater but less than 160° C. The film obtained by stretching at the temperature not greater than 100° C. is likely to break, while the film obtained by stretching at a temperature of 170° C. or greater is likely to have a low porosity and a high air permeability.

Stretching is preferably performed at two or more stages under the conditions as described above from the standpoint of the physical properties which the microporous film of the present embodiment is required to have or the intended use of the film. The film obtained by stretching at one stage sometimes does not satisfy the physical properties required.

It has been found surprisingly that when stretching is performed at two or more stages under the conditions as described above, the microporous film obtained in the present embodiment can have a permeability. In the thermoplastic resin composition film obtained by hot stretching at one stage as shown in Japanese Patent Laid-Open No. Hei 08-34872, pores are formed in the film but the film does not have permeability in the film thickness direction. It has been found, on the other hand, that stretching at two or more stages under the conditions as described above leads to formation of pores and formation of through-holes (pores are connected to each other three-dimensionally to form a through-hole in the film thickness direction), though details of the mechanism are not elucidated. The film has further improved heat resistance when obtained by stretching at two or more stages compared with the film obtained by stretching at one stage.

Further, for example, the microporous film thus obtained may be thermally fixed at a temperature of from 120 to 170° C. for the purpose of improving its size stability.

[Laminated Microporous Film]

The microporous film of the present embodiment may be laminated with another resin layer as needed. Examples of the another resin layer include microporous films composed of a polyolefin resin such as polyethylene resin or polypropylene resin and microporous films composed of a saturated polyester resin such as polyethylene terephthalate resin or polybutylene terephthalate resin. Preferably, it is desired to laminate the microporous film of the present embodiment with a microporous film made of a resin having a melting temperature, as measured by the method in accordance with JIS K-7121, of 100° C. or greater but not greater than 150° C. from the standpoint of the physical properties which the microporous film thus obtained is required to have or the intended use thereof. When the laminate of the microporous film of the present embodiment with the microporous film made of the above-described resin having a melting temperature of 100° C. or greater but not greater than 150° C. is used as a battery separator, the resulting battery can have drastically improved safety. Examples of the resin having a melting temperature of 100° C. or greater but not greater than 150° C. include polyethylene resins. As the polyethylene resin, so-called high density polyethylene, medium density polyethylene, and low density polyethylene can be used.

The another resin layer may contain a filler such as calcium carbonate, barium sulfate, alumina or talc. The laminate may have two or more layers and either of the microporous film of the present embodiment or the another resin layer may exist as a surface layer of the laminate.

The laminate can be produced by co-extrusion using a T-die or circular die; lamination in which layers are extruded separately and then laminated; and lamination in which films made porous, respectively, are laminated.

[Sea-Island Structure]

The microporous film of the present embodiment has a sea-island structure with the polyolefin resin as a sea portion and the polyphenylene ether resin as an island portion.

In the present embodiment, the term "sea-island structure" means a structure, as shown in the transmission electron micrograph of FIG. 1, in which framework of a polyolefin resin serving as a sea portion has been formed between island components composed of polyphenylene ether resin particles. In other words, it means a structure in which the polyolefin ether resin has been dispersed in the form of a plurality of islands in a matrix made of the polyolefin resin.

The sea-island structure (dispersed state) as described above can be measured and observed easily by using a transmission electron microscope. Observation through an electron microscope can be performed, for example, by placing on a sample stage a microporous film to be measured, giving osmium coating of about 3 nm to it, and observing the resulting film through a scanning electron microscope ("HITACHI S-4700") at an accelerated voltage of 1 kV.

The particle size of the island portion is preferably from 0.01 μm to 10 μm, more preferably from 0.1 μm to 5 μm. Controlling the particle size to fall within the above-described range contributes to uniformity of a pore structure (pore) of the microporous film both in the thickness direction and plane direction of the film. A microporous film having a uniform pore portion is suited as a battery separator.

In the present embodiment, the particle size is measured in the following manner.

First, a transmission electron micrograph (magnification: 5,000×) of a microporous film to be measured is obtained in the same manner as that employed for the measurement upon observation of the sea-island structure. Then, 100 polyphenylene ether resin particles dispersed in the matrix polyolefin resin are selected randomly and the maximum length and the minimum length of each of the particles are measured as a long axis diameter and a short axis diameter, respectively. The particle size means the long axis diameter.

A (long axis diameter)/(short axis diameter) ratio is preferably from 1 to 5, more preferably from 1 to 3. It is preferred from the standpoint of pore opening to set the (long axis diameter)/(short axis diameter) ratio within such a range.

By selecting the kind of the polyolefin resin, polyphenylene ether resin, and compatibilizing agent properly, the polyphenylene ether resin particles having such a particle size and a (long-axis diameter)/(short-axis diameter) ratio can be dispersed in the matrix polypropylene resin.

[Fundamental Physical Properties of Microporous Film (Table 1)]

The porosity of the microporous film of the present embodiment is preferably from 20% to 70%, more preferably from 35% to 65%, still more preferably from 45% to 60%. The microporous film having a porosity set at 20% or greater can keep a sufficient ion permeability when used for batteries. The microporous film having a porosity set at 70% or less, on the other hand, can keep a sufficient mechanical strength. When the porosity of the microporous film falls within the above-described range, the heat resistance improving effect attributable to the sea-island structure appears more marked.

The film thickness of the microporous film of the present embodiment is preferably from 5 to 40 μm, more preferably from 10 to 30 μm.

The porosity in the present embodiment can be adjusted by setting a composition ratio of the resin composition, stretching temperature, draw ratio, and the like properly.

The porosity can be determined by calculation in accordance with the following equation based on the volume and mass of a 10-cm square sample prepared in advance. The term "volume" as used herein means an apparent volume (including the volume of pores within the film). For example, the volume of a 10-cm square sample is 10 cm×10 cm×thickness (cm) of the film.

Porosity (%)=(volume (cm$^3$)−mass (g)/(density of a resin composition constituting the film))/volume (cm$^3$)×100

The air permeability of the microporous film of the present embodiment is preferably from 10 sec/100 cc to 5000 sec/100 cc, more preferably 50 sec/100 cc to 1000 sec/100 cc, more preferably from 100 sec/100 cc to 500 sec/100 cc. Controlling the air permeability so that it is 5000 sec or less is effective for ensuring a sufficient ion permeability. Controlling the air permeability so that it is 10 sec or greater, on the other hand, is preferred from the standpoint of obtaining a defect-free and uniform microporous film. In addition, when the air permeability of the microporous film falls within the above-described range, a heat resistance improving effect attributable to the sea-island structure appears more marked.

The air permeability in the present embodiment can be adjusted by setting the composition ratio of the resin composition, stretching temperature, draw ratio, or the like as needed.

The air permeability can be measured using a Gurley air permeability tester in accordance with JIS P-8117.

The microporous film of the present embodiment has an excellent porosity and air permeability thus it can be used as a separator for lithium ion batteries, and furthermore it has heat resistance. Described specifically, for example, when a polypropylene resin is used as the polyolefin resin, the resulting microporous film can keep the form as a film even at a temperature around or exceeding the melting temperature of the polypropylene resin, that is, 200° C. although it is a thermoplastic resin composition film having the polypropylene resin as a matrix. Such improvement in heat resistance is unexpected and surprising effect over the conventional technology.

When the microporous film of the present embodiment is used as a battery separator, the improvement in heat resistance leads to an increase in a film rupture temperature in a battery oven test that has been performed recently. The microporous film of the present embodiment can achieve a film rupture temperature of 200° C. or greater as described above. The microporous film obtained by the present embodiment and featuring a film rupture temperature as high as 200° C. or greater can have drastically improved heat resistance as a battery separator.

Details of the mechanism that can realize such a film rupture temperature of the microporous film of the present embodiment have not been elucidated yet but it is presumed that the morphology of the film having polyolefin such as PP as a sea portion and PPE as an island portion contributes to improvement in heat resistance (film rupture temperature).

EXAMPLES

The present embodiment will next be described more specifically by Examples and Comparative Examples. It should however be borne in mind that the present embodiment is not limited to the following Examples unless it departs from the scope of the present invention. The following are raw materials and evaluation methods of various properties used in the examples.

1. Polypropylene as Component (a)
(a-1) Propylene homopolymer, melt flow ratio=0.4
(a-2) Propylene homopolymer, melt flow ratio=75
(a-3) Propylene homopolymer, melt flow ratio=3.0
(a-4) Propylene homopolymer, melt flow ratio=2.5

2. PPE as Component (b)
PPE obtained by oxidative polymerization of 2,6-xylenol and having a reduced viscosity of 0.54

3. Compatibilizing Agent as Component (c)
(c-1) A hydrogenated product of a styrene-isoprene block copolymer having a (polystyrene (1))/(hydrogenated polyisoprene)/(polystyrene (2)) structure and having the following features: a bound styrene content of 48%, a number average molecular weight of 88,000, a total content of a 1,2-vinyl bond and a 3,4-vinyl bond of polyisoprene, before hydrogenation, of 55%, a number average molecular weight of polystyrene (1) of 21000, number average molecular weight of polystyrene (2) of 21000, and a hydrogenation ratio of the polyisoprene portion of 90%.
(c-2) A hydrogenated product of a styrene-butadiene block copolymer having a (polystyrene (1))/(hydrogenated polybutadiene)/(polystyrene (2)) structure and having the following features: a bound styrene content of 43%, a number average molecular weight of 95,000, a total content of a 1,2-vinyl bond and a 3,4-vinyl bond of polybutadiene, before hydrogenation, of 80%, a number average molecular weight of polystyrene (1) of 30,000, a number average molecular weight of polystyrene (2) of 10,000, and a hydrogenation ratio of the polybutadiene portion of 99.9%.
(c-3) A hydrogenated product of a styrene-butadiene block copolymer having a (polystyrene (1))/(hydrogenated polybutadiene)/(polystyrene (2)) structure and having the following features: a bound styrene content of 45%, a number average molecular weight of 90,000, a total content of a 1,2-vinyl bond and a 3,4-vinyl bond of polybutadiene, before hydrogenation, of 43%, a number average molecular weight of polystyrene (1) of 30,000, a number average molecular weight of polystyrene (2) of 10,000, and a hydrogenation ratio of the polybutadiene portion of 99.9%.
(c-4) A hydrogenated product of a styrene-butadiene block copolymer having a (polystyrene (1))/(hydrogenated polybutadiene)/(polystyrene (2)) structure and having the following features: a bound styrene content of 41%, a number average molecular weight of 92,000, a total content of a 1,2-vinyl bond and a 3,4-vinyl bond of polybutadiene, before hydrogenation, of 35%, a number average molecular weight of polystyrene (1) of 28,000, a number average molecular weight of polystyrene (2) of 10,000, and a hydrogenation ratio of the polybutadiene portion of 99.9%.

4. Inorganic Fine Particles as Component (d)
Aluminum oxide having an average particle size of 0.3 μm (1) Dispersed Particle Size (μm) of PPE
The particle size of PPE dispersed in the microporous film is measured in accordance with the description of this specification and a range (from maximum particle size to minimum particle size) of the particle size thus measured is shown. The fact that the dispersed particle size of PPE can be measured means that a sea-island structure has been formed in the microporous film.

(2) Stretchability
○: The film does not break during a stretching step.
×: The film has broken during a stretching step.

(3) Film Thickness (μm)
The film thickness is measured by using a dial gauge ("PEACOCK No. 25", trade name; product of OZAKI MFG. CO., LTD).

(4) Porosity (%)
The porosity of a 10-cm square sample taken from the microporous film is determined by calculating based on its volume and mass in accordance with the following equation:

$$\text{Porosity (\%)}=(\text{volume (cm}^3)-\text{mass (g)/(density of the thermoplastic resin composition constituting the film)})/\text{volume (cm}^3)\times 100$$

(5) Air Permeability (sec/100 cc)
The air permeability is measured using a Gurley air permeability tester in accordance with JIS P-8117. The gas permeability is a value determined in terms of a film thickness of 20 μm.

(6) Film Rupture Temperature
FIG. 2 is a schematic view of a measuring apparatus of a film rupture temperature, in which 1 is a microporous film, 2A and 2B are each a nickel foil of 10 μm thick, 3A and 3B are glass plates, 4 is an electrical resistance measuring apparatus (an LCR meter "AG-4311" (trade name), product of Ando Denki) connected to the nickel foils 2A and 2B, 5 is a thermocouple connected to a thermometer 6, 7 is a data collector connected to the electrical resistance measuring apparatus 4 and the thermometer 6, and 8 is an oven for heating the microporous film.

More specifically, the microporous film 1 is stacked on the nickel foil 2A as illustrated in FIG. 3 and fixed to the nickel foil 2A with a "Teflon" (trade mark) tape (a hatched portion in the drawing) in a longitudinal direction (in the direction of the arrow in the figure). The microporous film 1 has been impregnated with 1 mol/liter of a borofluoride lithium solution (solvent: propylene carbonate/ethylene carbonate/γ-butyrolactone=1/1/2) serving as an electrolyte. The nickel foil 2B is, as illustrated in FIG. 4, masked with a "Teflon" (trade mark) tape (hatched portion in the drawing) leaving a portion of a window 9 of 15 mm×10 mm at the center of the foil 2B unmasked.

The nickel foil 2A and the nickel foil 2B are stacked so as to sandwich the microporous film 1 therebetween and these two nickel foils are sandwiched between glass plates 3A and 3B from both sides of the nickel foils. They are stacked so that the window portion of the foil 2B faces to the microporous film 1. The two glass plates are fixed by clipping them with a commercially available double clip. The thermocouple 5 is fixed to the glass plates with a "Teflon" (trade mark) tape.

By using such an apparatus, the temperature and the electrical resistance are measured continuously. The temperature is raised at a rate of 2° C./min from 25° C. to 200° C. and the electrical resistance is measured with an alternating electric current of 1 kHz. The film rupture temperature (short-circuit temperature) is defined as a temperature at which the electrical resistance of the microporous film falls below $10^3 \Omega$ once the electrical resistance has reached $10^3 \Omega$. When the resistance exceeds $10^3 \Omega$ from the beginning, the temperature at which the electrical resistance falls below $10^3 \Omega$ is defined as the film rupture (short-circuit) temperature.

The film rupture temperature is evaluated based on the following criteria:
  ○: Short-circuit does not occur.
  ×: Short-circuit occurs.

Example 1

85 parts by mass of the component (a-1), 15 parts by mass of the component (a-2), 67 parts by mass of the polyphenylene ether resin (b), and 17 parts by mass of the compatibilizing agent (c-1) were blended in a molten state with a twin-screw extruder having a first raw material supply port and a second raw material supply port (located almost at the center of the extruder), which is set at a temperature of from 260 to 320° C. and a screw rotation speed of 300 rpm, by supplying the extruder with the component (b) or the component (b) and portions of the components (a-1) and (a-2) from the first raw material supply port of the extruder and the components (a-1) and (a-2) and the component (c-1) or the remaining portions of the components (a-1) and (a-2) and the component (c-1) from the second raw material support port to obtain a thermoplastic resin composition in the form of pellets.

The pellets of the thermoplastic resin composition thus obtained were charged, through a feeder, in a single-screw extruder which has a screw diameter of 20 mm and an L/D ratio of 30 and which is set at 260° C. Immediately after extrusion from a T-die provided at the end of the extruder and having a lip thickness of 0.5 mm, the molten resin was exposed to a cold wind and taken up with a casting roll cooled to 95° C. to form a precursor film.

After the resulting precursor film was monoaxially stretched (in the MD direction, hereinafter "monoaxially stretched" means "monoaxially stretched in the MD direction") at a draw ratio of 1.5 at a temperature of 25° C., the resulting film was monoaxially stretched (in the MD direction, which will equally apply hereinafter) further at a draw ratio of 2.0 at a temperature of 150° C., and heat fixed at 170° C. to obtain a microporous film. The film thickness, porosity, air permeability, and film rupture temperature of the resulting microporous film were measured. The results are shown in Table 1.

Example 2

100 parts by mass of the polypropylene resin (a-1), 11 parts by mass of the polyphenylene ether resin (b), and 3 parts by mass of the compatibilizing agent (c-2) were blended in a molten state with a twin-screw extruder having a first raw material supply port and a second raw material supply port (located almost at the center of the extruder), which was set at a temperature of from 260 to 320° C. and a screw rotation speed of 300 rpm, by supplying the extruder with the component (b) and the component (C-2) or the component (b), the component (c-2) and a portion of the component (a-1) from the first raw material supply port of the extruder and the component (a-1) or the remaining portion of the component (a-1) from the second raw material support port to obtain a thermoplastic resin composition in the form of pellets. In the same manner as that employed in Example 1 except that the pellets of the thermoplastic resin composition thus obtained were used instead, a microporous film was produced. The film was evaluated in the same manner as that employed in Example 1. The results are shown in Table 1.

Example 3

A precursor film was prepared in the same manner as that employed in Example 1. The resulting precursor film was monoaxially stretched at a draw ratio of 1.5 at a temperature of 90° C., monoaxially stretched further at a draw ratio of 2.0 at a temperature of 150° C. and then, heat fixed at 170° C. to obtain a microporous film. The microporous film thus obtained was evaluated in the same manner as that employed in Example 1. The results are shown in Table 1.

Example 4

A precursor film was prepared in the same manner as that employed in Example 1. The resulting precursor film was monoaxially stretched at a draw ratio of 1.5 at a temperature of 25° C., monoaxially stretched further at a draw ratio of 2.0 at a temperature of 110° C. and then, heat fixed at 170° C. to obtain a microporous film. The microporous film thus obtained was evaluated in the same manner as that employed in Example 1. The results are shown in Table 1.

Example 5

As the polyethylene resin, pellets of "Suntec S160S", product of Asahi Kasei Chemicals were charged, through a feeder, in a single-screw extruder which has a screw diameter of 20 mm and an L/D ratio of 30 and which is set at 180° C., followed by extrusion from a T-die provided at the end of the extruder and having a lip thickness of 3.0 mm. Immediately after the extrusion, the molten resin was exposed to a cold wind of 25° C. and taken up with a casting roll cooled to 95° C. to form a precursor film.

The resulting precursor film was heat treated at 110° C. for one hour, monoaxially stretched at a draw ratio of 1.5 at a temperature of 25° C., monoaxially stretched further at a draw ratio of 2.0 at a temperature of 110° C. and then, heat fixed at 130° C. to obtain a microporous film A made of polyethylene.

The microporous film A made of polyethylene (melting temperature: 135° C., film thickness: 10 μm, porosity: 40%, air permeability: 250 sec/100 cc) thus obtained and a microporous film B (film thickness: 10 μm, porosity: 55%, air permeability: 350 sec/100 cc) obtained in the same manner as that employed in Example 1 except that the film thickness was changed were laminated by using a laminator to obtain a three-layer microporous film having a layer constitution of B/A/B. The three-layer microporous film thus obtained was evaluated in the same manner as that employed in Example 1. The results are shown in Table 1.

Example 6

100 parts by mass of the polypropylene resin (a-1), 67 parts by mass of the polyphenylene ether resin (b), and 17 parts by mass of the compatibilizing agent (c-3) were blended in a molten state with a twin-screw extruder having a first raw material supply port and a second raw material supply port (located almost at the center of the extruder), which was set at a temperature of from 260 to 320° C. and a screw rotation speed of 300 rpm, by supplying the extruder with the component (b) and the component (c-3) or the component (b), the component (c-3) and a portion of the component (a-1) from the first raw material supply port of the extruder and the component (a-1) or the remaining portion of the component (a-1) from the second raw material support port to obtain a thermoplastic resin composition in the form of pellets.

In the same manner as that employed in Example 1 except that the pellets of the thermoplastic resin composition thus obtained were used, a microporous film was produced. The film was evaluated in the same manner as that employed in Example 1. The results are shown in Table 1.

Comparative Example 1

The component (a-3) was charged, through a feeder, in a single-screw extruder which has a screw diameter of 20 mm and an L/D ratio of 30 and which is set at 220° C. and extruded from a T-die provided at the end of the extruder and having a lip thickness of 3.0 mm. Immediately after the extrusion, the molten resin was exposed to a cold wind of 25° C. and taken up with a casting roll cooled to 95° C. to form a precursor film.

The resulting precursor film was heat treated at 130° C. for one hour, monoaxially stretched at a draw ratio of 1.5 at a temperature of 25° C., monoaxially stretched further at a draw ratio of 2.0 at a temperature of 110° C. and then, heat fixed at 150° C. to obtain a microporous film. The film thickness, porosity, air permeability, and film rupture temperature of the resulting microporous film were measured. The results are shown in Table 1.

Comparative Example 2

100 parts by mass of the component (a-3) and 67 parts by mass of aluminum oxide (d) were blended in a molten state with a twin-screw extruder, which was set at a temperature of 220° C. and a screw rotation speed of 100 rpm, to obtain a thermoplastic resin/inorganic fine-particle composition in the form of pellets.

The pellets of the thermoplastic resin/inorganic fine-particle composition thus obtained were charged, through a feeder, in a single-screw extruder which has a screw diameter of 20 mm and an L/D ratio of 30 and which is set at 220° C. and extruded from a T-die provided at the end of the extruder and having a lip thickness of 3.0 mm. Immediately after the extrusion, the molten resin was exposed to a cold wind of 25° C. and taken up with a casting roll cooled to 95° C. to form a precursor film. A microporous film was produced in the same manner as that employed in Comparative Example 1 except that the pellets of the thermoplastic resin/inorganic fine-particle composition were used. The microporous film thus obtained was evaluated in the same manner as that employed in Example 1. The results are shown in Table 1.

Comparative Example 3

100 parts by mass of the polypropylene resin (a-4), 233 parts by mass of the polyphenylene ether resin (b), and 33 parts by mass of the compatibilizing agent (c-2) were blended in a molten state with a twin-screw extruder having a first raw material supply port and a second raw material supply port (located almost at the center of the extruder), which was set at a temperature of from 260 to 320° C. and a screw rotation speed of 300 rpm by supplying the extruder with the component (b) and the component (c-2) or the component (b), the component (c-2) and a portion of the component (a-4) from the first raw material supply port of the extruder and the component (a-4) or the remaining portion of the component (a-4) from the second raw material support port to obtain a thermoplastic resin composition in the form of pellets.

The pellets of the thermoplastic resin composition thus obtained were charged, through a feeder, in a single-screw extruder which has a screw diameter of 20 mm and an L/D ratio of 30 and which is set at 280° C. and extruded from a T-die provided at the end of the extruder and having a lip thickness of 0.5 mm. Immediately after the extrusion, the molten resin was exposed to a cold wind of 25° C. and taken up with a casting roll cooled to 95° C. to form a precursor film.

After the resulting precursor film was monoaxially stretched at a draw ratio of 1.5 at a temperature of 25° C., the resulting stretched film was monoaxially stretched further at a temperature of 150° C. During the stretching, however, the film broke so that evaluation after that was not conducted.

Comparative Example 4

85 parts by mass of the component (a-1), 15 parts by mass of the component (a-2), and 67 parts by mass of the polyphenylene ether resin (b) were blended in a molten state with a twin-screw extruder having a first raw material supply port and a second raw material supply port (located almost at the center of the extruder), which was set at a temperature of from 260 to 320° C. and a screw rotation speed of 300 rpm by supplying the extruder with the component (b) or the component (b) and portions of the components (a-1) and (a-2) from the first raw material supply port of the extruder and the components (a-1) and (a-2) or the remaining portions of the components (a-1) and (a-2) from the second raw material support port to obtain a thermoplastic resin composition in the form of pellets.

The pellets of the thermoplastic resin composition thus obtained were charged, through a feeder, in a single-screw extruder which has a screw diameter of 20 mm and an L/D ratio of 30 and which is set at 260° C. and extruded from a T-die provided at the end of the extruder and having a lip thickness of 0.5 mm. Immediately after the extrusion, the molten resin was exposed to a cold wind of 25° C. and taken up with a casting roll cooled to 95° C. to form a precursor film.

After the resulting precursor film was monoaxially stretched at a draw ratio of 1.5 at a temperature of 25° C., the resulting stretched film was monoaxially stretched further at a temperature of 150° C. The film, however, broke during the stretching so that evaluation after that was not conducted.

Comparative Example 5

85 parts by mass of the component (a-1), 15 parts by mass of the component (a-2), 67 parts by mass of the polyphenylene ether resin (b), and 72 parts by mass of the compatibilizing agent (c-1) were blended in a molten state with a twin-screw extruder having a first raw material supply port and a second raw material supply port (located almost at the center of the extruder), which was set at a temperature of from 260 to 320° C. and a screw rotation speed of 300 rpm, by supplying the extruder with the component (b) or the component (b) and portions of the components (a-1) and (a-2) from the first raw material supply port of the extruder and the components (a-1) and (a-2) and the component (c-1) or the remaining portions of the components (a-1) and (a-2) and the component (c-1) from the second raw material support port to obtain a thermoplastic resin composition in the form of pellets.

In the same manner as that employed in Example 1 except that the pellets of the thermoplastic resin composition thus obtained were used, a microporous film was produced. The resulting microporous film was evaluated in the same manner as that employed in Example 1. The results are shown in Table 1.

Comparative Example 6

In the same manner as that employed in Example 1, a precursor film was prepared. The precursor film thus obtained was monoaxially stretched at a draw ratio of 3.0 at a temperature of 150° C. and then heat fixed at 170° C. to obtain a stretched film. The film thickness, porosity, air permeability, and film rupture temperature of the resulting microporous film were measured. The results are shown in Table 1.

Comparative Example 7

100 parts by mass of the component (a-1), 67 parts by mass of the polyphenylene ether resin (b), and 17 parts by mass of the compatibilizing agent (c-4) were blended in a molten state with a twin-screw extruder having a first raw material supply port and a second raw material supply port (located almost at the center of the extruder), which was set at a temperature of from 260 to 320° C. and a screw rotation speed of 300 rpm, by supplying the extruder with the component (b) and the component (c-4) or the component (b), the component (c-4), and a portion of the component (a-1) from the first raw material supply port of the extruder and the component (a-1) or the remaining portion of the component (a-1) from the second raw material support port to obtain a thermoplastic resin composition in the form of pellets.

In the same manner as that employed in Example 1 except that the pellets of the thermoplastic resin composition thus obtained were used, a microporous film was produced. In the same manner as that employed in Example 1, the resulting microporous film was evaluated. The results are shown in Table 1.

Comparative Example 8

In the same manner as that employed in Example 1, a precursor film was prepared. The resulting precursor film was monoaxially stretched at a draw ratio of 1.5 at a temperature of −30° C. The film, however, broke during the stretching so that evaluation of the film after that was not conducted.

Comparative Example 9

In the same manner as that employed in Example 1, a precursor film was prepared. The resulting precursor film was monoaxially stretched at a draw ratio of 1.5 at a temperature of 25° C. Then, the stretched film was monoaxially stretched further at a draw ratio of 2.0 at a temperature of 175° C. The film, however, broke during the stretching so that evaluation of the film after that was not conducted.

TABLE 1

| | | | Ex. 1 | Ex. 2 | Ex. 3 | Ex. 4 | Ex. 5 | Ex. 6 | Comp. Ex. 1 | Comp. Ex. 2 |
|---|---|---|---|---|---|---|---|---|---|---|
| Raw material composition | Component (a-1) | (parts by mass) | 85 | 100 | 85 | 85 | 85 | 100 | | |
| | Component (a-2) | | 15 | | 15 | 15 | 15 | | | |
| | Component (a-3) | | | | | | | | 100 | 100 |
| | Component (a-4) | | | | | | | | | |
| | Component (b) | | 67 | 11 | 67 | 67 | 67 | 67 | | |
| | Component (c-1) | | 17 | | 17 | 17 | 17 | | | |
| | Component (c-2) | | | 3 | | | | | | |
| | Component (c-3) | | | | | | | 17 | | |
| | Component (c-4) | | | | | | | | | |
| | Component (d) | | | | | | | | | 67 |
| Lamination with polyethylene microporous film | | | Single layer | Single layer | Single layer | Single layer | Laminate | Single layer | Single layer | Single layer |
| PPE dispersed particle size (μm) | | | 0.1-2 | 0.1-2.5 | 0.1-2 | 0.1-2 | 0.1-2 | 0.1-2.5 | — | — |
| Stretchability | | | ○ | ○ | ○ | ○ | ○ | ○ | ○ | ○ |
| Fundamental physical properties | Film thickness (μm) | | 22 | 20 | 18 | 28 | 32 | 33 | 15 | 15 |
| | Porosity (%) | | 55 | 45 | 37 | 42 | 42 | 49 | 40 | 45 |
| | Air permeability (sec/100 cc) | | 350 | 1000 | 1500 | 1000 | 650 | 1600 | 500 | 400 |
| | Film rupture temperature | 150° C. | ○ | ○ | ○ | ○ | ○ | ○ | ○ | ○ |
| | | 175° C. | ○ | ○ | ○ | ○ | ○ | ○ | x | x |
| | | 200° C. | ○ | ○ | ○ | ○ | ○ | ○ | x | x |

| | | | Comp. Ex. 3 | Comp. Ex. 4 | Comp. Ex. 5 | Comp. Ex. 6 | Comp. Ex. 7 | Comp. Ex. 8 | Comp. Ex. 9 |
|---|---|---|---|---|---|---|---|---|---|
| Raw material composition | Component (a-1) | (parts by mass) | | 85 | 85 | 85 | 100 | 85 | 85 |
| | Component (a-2) | | | 15 | 15 | 15 | | 15 | 15 |
| | Component (a-3) | | | | | | | | |
| | Component (a-4) | | 100 | | | | | | |
| | Component (b) | | 233 | 67 | 67 | 67 | 67 | 67 | 67 |
| | Component (c-1) | | | | 72 | 17 | | 17 | 17 |
| | Component (c-2) | | 33 | | | | | | |
| | Component (c-3) | | | | | | | | |
| | Component (c-4) | | | | | | 17 | | |
| | Component (d) | | | | | | | | |
| Lamination with polyethylene microporous film | | | Single layer | Single layer | Single layer | Single layer | Single layer | Single layer | Single layer |
| PPE dispersed particle size (μm) | | | 20-50 | — | 0.05-1 | 0.1-2 | 0.5-3 | — | — |
| Stretchability | | | x | x | ○ | ○ | ○ | x | x |
| Fundamental physical properties | Film thickness (μm) | | — | — | 27 | 32 | 34 | — | — |
| | Porosity (%) | | — | — | 85 | 31 | 55 | — | — |
| | Air permeability (sec/100 cc) | | — | — | 5 | 10,000 | 8,000 | — | — |
| | Film rupture temperature | 150° C. | — | — | ○ | ○ | ○ | — | — |
| | | 175° C. | — | — | x | ○ | ○ | — | — |
| | | 200° C. | — | — | x | x | x | — | — |

The following can be confirmed from the results of Table 1.

The microporous films (Example 1 to 6) in the present embodiment having a sea-island structure each has a high film rupture temperature and is excellent in heat resistance compared with the microporous film of Comparative Example 1 having no sea-island structure.

The microporous films (Example 1 to 6) produced by stretching at two or more stages and controlling the temperature of the first stretching step each has a good air permeability and shows a large improvement in heat resistance compared with the microporous film (Comparative Example 5) produced by carrying out the stretching step at one stage.

These films have a film rupture temperature of 200° C. or greater and thus, have drastically improved heat resistance so that they can improve safety against the short-circuit (short) of a battery when used as a battery separator.

DESCRIPTION OF REFERENCE NUMERALS

Figure 1:
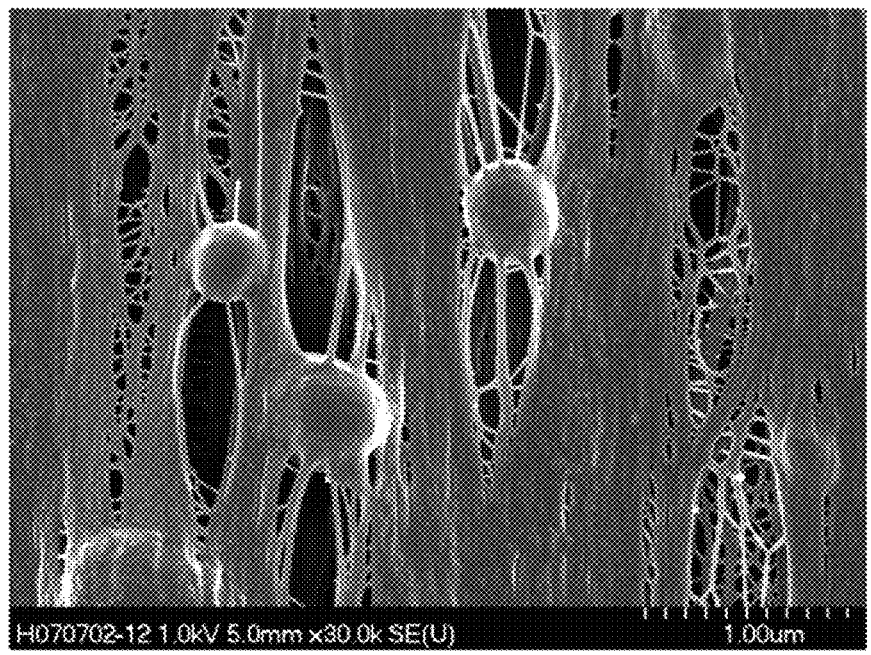
FIG. 1 A transmission electron micrograph of a microporous film obtained in Example 1.
Figure 2:
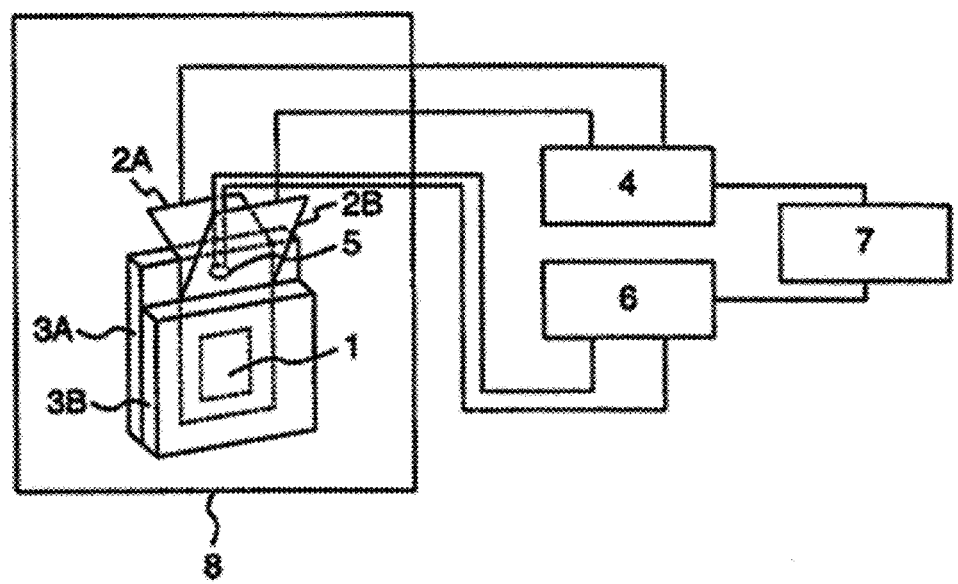
FIG. 2 A schematic view of a measuring apparatus of a film rupture temperature.
Figure 3:
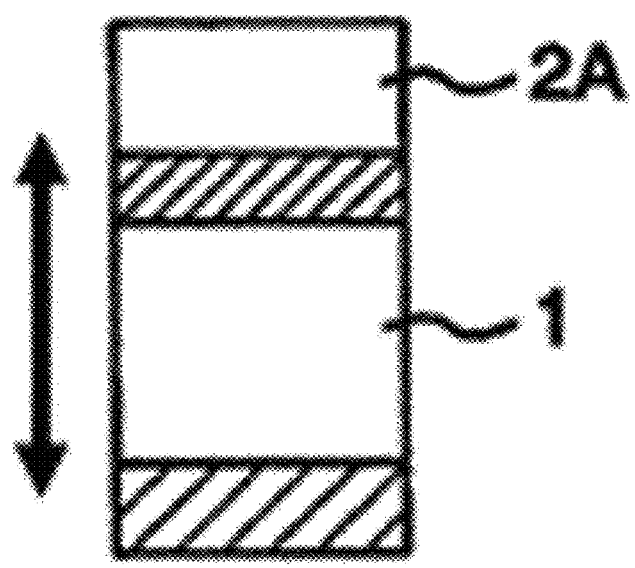
FIG. 3 A plan view illustrating a portion of the measuring apparatus of a film rupture temperature.
Figure 4:
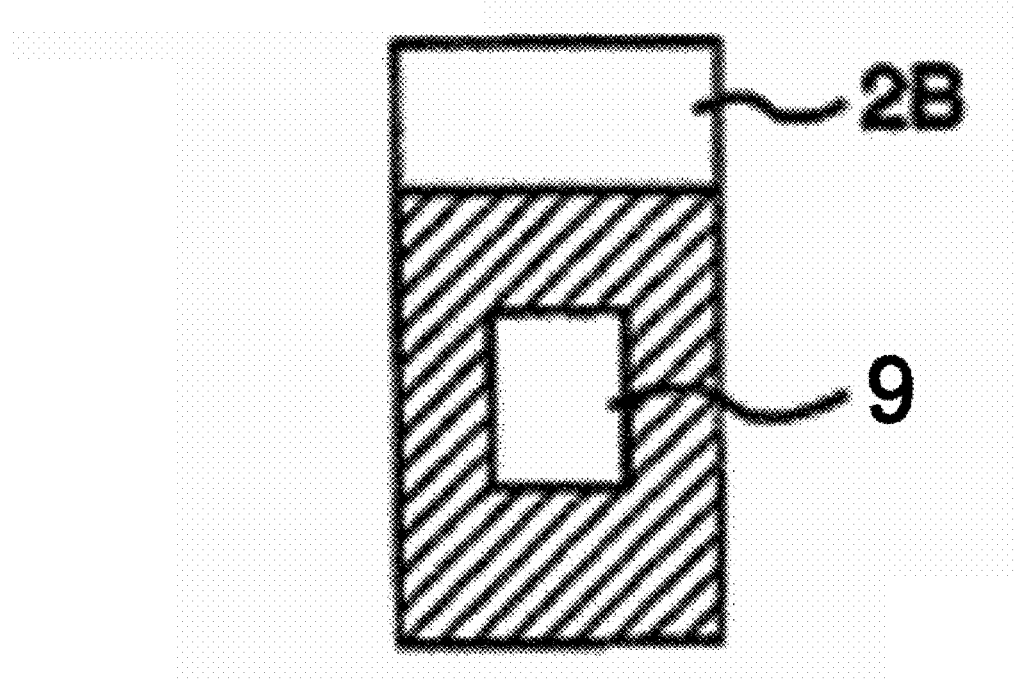
FIG. 4 A plan view illustrating a portion of the measuring apparatus of a film rupture temperature.

| 1 | microporous film |
|---|---|
| 2A | nickel foil |
| 2B | nickel foil |
| 3A | glass plate |
| 3B | glass plate |
| 4 | electrical resistance measuring apparatus |
| 5 | thermocouple |
| 6 | thermometer |
| 7 | data collector |
| 8 | oven |
| 9 | window |

The invention claimed is:

1. A microporous film which is formed of a thermoplastic resin composition comprising 100 parts by mass of (a) a polyolefin resin and from 5 to 90 parts by mass of (b) a polyphenylene ether resin, the microporous film having a sea-island structure with the polyolefin resin as a sea portion and the polyphenylene ether resin as an island portion and having a air permeability of from 10 sec/100 cc to 5000 sec/100 cc.

2. The microporous film according to claim 1, wherein the polyolefin resin (a) is a polypropylene resin or a polyethylene resin.

3. The microporous film according to claim 1 or 2, having a porosity of from 20% to 70%.

4. The microporous film according to claim 1 or 2, wherein the thermoplastic resin composition further comprises from 1 to 20 mass % of (c) a compatibilizing agent.

5. The microporous film according to claim 4, wherein the compatibilizing agent (c) is a hydrogenated block copolymer obtained by hydrogenating a block copolymer having at least one polymer block A composed mainly of a vinyl aromatic compound and at least one polymer block B composed mainly of a conjugated diene compound with a total content of a 1,2-vinyl bond and a 3,4-vinyl bond of from 30 to 90%.

6. The microporous film according to claim 1 or 2, wherein the island portion has a particle size of from 0.01 μm to 10 μm.

7. A laminated microporous film having the microporous film as claimed in claim 1 or 2 and a microporous film formed of a thermoplastic resin having a melting temperature of from 100° C. to 150° C.

8. A battery separator having the microporous film as claimed in claim 1 or 2.

9. A method of producing the microporous film as claimed in claim 1 or 2, which comprises the following steps (A) and (B):

(A) a step of cold stretching a film composed of a thermoplastic resin composition comprising 100 parts by mass of (a) a polypropylene resin and from 5 to 90 parts by mass of (b) a polyphenylene ether resin at a temperature of −20° C. or greater but less than 100° C., and (B) a step, after the cold stretching step, of hot stretching the cold-stretched film at a temperature of 100° C. or greater but less than 170° C.

\* \* \* \* \*